(12) United States Patent
McKnight et al.

(10) Patent No.: US 9,643,379 B1
(45) Date of Patent: May 9, 2017

(54) MICROSTRUCTURED RECONFIGURABLE COMPOSITE MATERIAL

(71) Applicant: HRL Laboratories, LLC, Malibu, CA (US)

(72) Inventors: Geoffrey P. McKnight, Los Angeles, CA (US); Christopher Paul Henry, Thousand Oaks, CA (US); Guillermo Herrera, Winnetka, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/835,455

(22) Filed: Aug. 25, 2015

Related U.S. Application Data

(60) Division of application No. 12/354,662, filed on Jan. 15, 2009, now Pat. No. 9,211,690, which is a continuation-in-part of application No. 12/212,469, filed on Sep. 17, 2008, now Pat. No. 8,409,691.

(60) Provisional application No. 60/973,004, filed on Sep. 17, 2007.

(51) Int. Cl.
*B32B 3/14* (2006.01)
(52) U.S. Cl.
CPC .......... *B32B 3/14* (2013.01); *B32B 2260/046* (2013.01); *B32B 2307/544* (2013.01)
(58) Field of Classification Search
CPC ................ B32B 3/14; B32B 2260/046; B32B 2307/544
See application file for complete search history.

(56) References Cited

U.S. PATENT DOCUMENTS

| | | | |
|---|---|---|---|
| 2,954,622 A | 10/1960 | Moore | |
| 3,397,496 A | 8/1968 | Sohns | |
| 4,353,433 A | 10/1982 | Mohrenstein-Ertel et al. | |
| 4,522,393 A | 6/1985 | Dunn | |
| 5,306,532 A | 4/1994 | Tsien et al. | |
| 5,368,930 A | 11/1994 | Samples | |
| 5,407,612 A | 4/1995 | Gould et al. | |
| 5,601,895 A | 2/1997 | Cunningham | |
| 5,906,873 A | 5/1999 | Kim | |
| 6,000,660 A | 12/1999 | Griffin et al. | |
| 6,175,170 B1 | 1/2001 | Kota et al. | |
| 6,182,929 B1 | 2/2001 | Martin et al. | |
| 6,265,333 B1 | 7/2001 | Dzenis et al. | |
| 6,301,742 B1 | 10/2001 | Kota | |
| 6,447,478 B1 | 9/2002 | Maynard | |
| 6,664,702 B2 | 12/2003 | Soroushian | |
| 6,962,739 B1 | 11/2005 | Kim et al. | |
| 7,250,839 B2 | 7/2007 | Racz et al. | |

(Continued)

OTHER PUBLICATIONS

Semiatin, S.L., "Metalworking: Sheet Forming", ASM Handbook, vol. 24B, Aug. 31, 2006, ASM International, p. 668.

(Continued)

*Primary Examiner* — Nathan Van Sell
(74) *Attorney, Agent, or Firm* — Lewis Roca Rothgerber Christie LLP

(57) ABSTRACT

A microstructured reconfigurable or morphing composite material with controlled anisotropic deformation properties. The composite material provides highly controlled deformation and stiffness properties. Microscopic three dimensional structures are included in the composite material to control its deformation kinematics and stiffness properties. The composite material has highly segregated in-plane and out-of-plane stiffness properties.

6 Claims, 15 Drawing Sheets

(56) References Cited

U.S. PATENT DOCUMENTS

| | | |
|---|---|---|
| 7,550,189 B1 | 6/2009 | McKnight et al. |
| 7,901,524 B1 | 3/2011 | McKnight et al. |
| 7,972,549 B2 | 7/2011 | O'Connor et al. |
| 8,057,206 B1 | 11/2011 | McKnight |
| 8,071,171 B1 | 12/2011 | Doty et al. |
| 8,354,170 B1 | 1/2013 | Henry et al. |
| 8,409,691 B1 | 4/2013 | Henry et al. |
| 8,557,160 B2 | 10/2013 | O'Connor et al. |
| 2003/0102411 A1 | 6/2003 | Kota |
| 2003/0119958 A1 | 6/2003 | Zhang et al. |
| 2003/0180540 A1 | 9/2003 | O'Connor et al. |
| 2003/0234598 A1 | 12/2003 | Fuller et al. |
| 2003/0235460 A1 | 12/2003 | Moon et al. |
| 2004/0197519 A1 | 10/2004 | Elzey et al. |
| 2006/0163431 A1 | 7/2006 | Dittrich |
| 2006/0192465 A1 | 8/2006 | Kornbluh et al. |
| 2006/0277950 A1 | 12/2006 | Rock |
| 2007/0202296 A1 | 8/2007 | Chandrasekaran et al. |
| 2007/0207186 A1 | 9/2007 | Scanlon et al. |

OTHER PUBLICATIONS

Office Action, dated Jan. 27, 2011, for U.S. Appl. No. 12/212,469, 13 pages.

Yalcintas et al., Magnetorheological and electroheological materials in adaptive structures and their performance comparison, Smart Mater. Struct., Oct. 19, 1998, pp. 560-573, vol. 8, UK.

Lake et al., Application of Elastic Memory Composite Materials of Deployable Space Structures, AIAA 2001 Conference, Aug. 2001, pp. 1-10, AIAA 2001-4602, Virginia.

Cadogan et al., Shape Memory Composite Development for Use in Gossamer Space Inflatable Structures, AIAA 43rd Structures, Structural Dynamics, and Materials Conference, Apr. 2002, pp. 1-11, AIAA 2002-1372, Virginia.

Abrahamson et al., Shape Memory Polymers for Elastic Memory Composites, AIAA 43rd Structures, Structural Dynamics, and Materials Conference, Apr. 2002, pp. 1-11, AIAA 2002-1562, Virginia.

Lake et al., The Fundamentals of Designing Deployable Structures with Elastic Memory Composites, AIAA 43rd Structures, Structural Dynamics, and Materials Conference, Apr. 2002, pp. 1-13, AIAA 2002-1454, Virginia.

Campbell et al., Deployment Precision and Mechanics of Elastic Memory Composites, AIAA 44th Structures, Structural Dynamics, and Materials Conference, Apr. 2003, pp. 1-9, AIAA 2003-1495, Virgina.

Francis et al., Development and Testing of a Hinge/Actuator Incorporating Elastic Memory Composites, AIAA 44th Structures, Structural Dynamics, and Materials Conference, Apr. 2003, pp. 1-14, AIAA 2003-1496, Virginia.

McKnight, G. and Barvosa-Carter, W. U.S. Appl. No. 11/193,148, filed Jul. 29, 2005, entitled "Variable Stiffness Structure," Specification, Claims & Abstract (39 pages); Drawings (5 Sheets).

McKnight, G. et al. "Bill Armstrong Memorial Session: Elastic Modulus and Strain Recovery Testing of Variable Stiffness Composites for Structural Reconfiguration." Proc. SPIE, vol. 6526. 652617 (2007), 11 pages.

McKnight, G. and Henry, C. P. "Variable Stiffness Materials for Reconfigurable Surface Applications," Proc. SPIE, vol. 5167, 119 (2005).

McKnight, G. and Henry, C. P. "Large Strain Variable Stiffness Composites for Shear Deformations with Applications to Morphing Aircraft Skins." Proc. SPIE, vol. 6929, 692919 (2008), 12 pages.

Langley Research Center, Hampton, Virginia 23665. "Technical Support Package. Composite Elastic Skins for Shape-Changing Structures." NASA Tech Briefs, LAR-16599-1, National Aeronautics and Space Administration, 19 pages.

Henry, C. P. and McKnight, G. P. "3D FEA Simulation of Segmented Reinforcement Variable Stiffness Composites," Proc. SPIE, vol. 6929, 69290x (2008), Abstract, 1 page.

Henry, C. and McKnight, G. Cellular Variable Stiffness Materials for Ultra-Large Reversible Deformations in Reconfigurable Structures,: Proc. SPIE, vol. 6170, 617023 (2006), Abstract, 1 page.

MICROSTRUCTURED RECONFIGURABLE COMPOSITE MATERIAL

CROSS-REFERENCE TO RELATED APPLICATION(S)

This application is a divisional of U.S. patent application Ser. No. 12/354,662, filed on Jan. 15, 2009, which in turn is a continuation-in-part of U.S. patent application Ser. No. 12/212,469, filed on Sep. 17, 2008, issued as U.S. Pat. No. 8,409,691 on Apr. 2, 2013, which claims priority and benefit of U.S. Provisional Application No. 60/973,004, filed on Sep. 17, 2007, and is also related to U.S. patent application Ser. No. 11/193,148, filed on Jul. 29, 2005, issued as U.S. Pat. No. 7,550,189 on Jun. 23, 2009. The entire contents of all of the applications set forth above are incorporated herein by reference.

STATEMENT REGARDING FEDERALLY SPONSORED RESEARCH OR DEVELOPMENT

This invention was made with U.S. Government support under Contract No. FA8650-06-C-5059 awarded by the Air Force Research Laboratory. The U.S. Government has certain rights to this invention.

BACKGROUND

1. Field of the Invention

The present invention is related to composite materials, and more particularly, to reconfigurable composite materials.

2. Description of Related Art

Conventional structural design typically uses fixed geometry structural elements designed to provide acceptable performance over a range of operating conditions. However, fixed geometry structural elements limit the degree of optimization that can be achieved over the range of operating conditions. Reconfigurable surface technology, which permits structural components to undergo large-scale, in-service changes in component geometry could provide performance enhancements of the structural design over broad operating conditions. Additionally, reconfigurable surface technology could enable a structural design with multi-function capabilities, optimized wave interactions (e.g., electromagnetic, shock, sound, air flow), and improved deployment/storage usability for traveling among others.

Applications that may benefit from reconfigurable surface technology include aircraft wings, control surfaces, and field-deployable structures. Reconfigurable (or morphing) surfaces require large reversible deformations, low parasitic mass, reconfiguration speed appropriate to the application, high degree of shape control and ability to scale to large areas. Morphing or reconfigurable structures potentially allow for previously unattainable performance by permitting several optimized structures to be achieved using a single platform (or structure). New engineered materials (e.g., a composite material) that may achieve the necessary deformations but limit losses in parasitic actuation mass and structural efficiency (stiffness/weight) are needed. These new materials should exhibit precise control of deformation properties and provide high stiffness when exercised through large deformations.

Prior approaches to achieve a reconfigurable or morphing structure such as a morphing airplane wing rely on designs that are relatively mass-inefficient as compared to conventional airframe design. The inefficiency results from the need to use soft, flexible materials such as shape memory polymer matrix composites as the wing skin, forcing structural mass to be concentrated in the interior where it reduces stiffness of the whole structure, as compared to torsion box designs.

Shape memory polymer matrix composites have shown reversible deformation recovery through the combined effect of the energy stored in the reinforcement phase and from the shape memory effect of the polymer. Prior approaches utilize composite fiber reinforcement such as carbon fiber in uni-axial, cross-ply, or woven configurations. The principal challenges in using fibers for these applications are the inextensibility of the fibers, limiting the deformation primarily to bending, and the poor stability of the fiber in compression leading to microbuckling.

Therefore, there is currently much interest in reconfigurable or morphing structures capable of performing large changes in various physical configurations (e.g., a wing or engine inlet) such that optimized performance may be achieved over a broad range of operational conditions. It is desirable to have materials that provide controllable stiffness properties and large deformation. It is also desirable to have materials with attributes suitable for morphing structures such as relatively low in-plane axial stiffness for efficient shape changing, combined with good resistance to out of plane deformations such as those exerted by pressure loading of air or water.

SUMMARY OF THE INVENTION

Aspects of embodiments of the present invention are directed toward a microstructured reconfigurable or morphing composite material with controlled anisotropic deformation properties. The microstructured reconfigurable composite material provides highly controlled deformation and stiffness properties. In some embodiments of the present invention, microscopic three dimensional structures are included in the composite material to control its deformation kinematics and stiffness properties. In some embodiments of the present invention, the composite material has highly segregated in-plane and out-of-plane stiffness properties.

According to an embodiment of the present invention, a microstructured composite material with controlled deformation is provided. The microstructured composite material includes a matrix material and at least three reinforcement layers embedded in the matrix material. The at least three reinforcement layers are embedded in the matrix material, and each of the at least three reinforcement layers includes a plurality of platelets arranged along a plane of the matrix material. A plurality of connecting members interconnect the plurality of platelets along the plane of the matrix material. Means is provided for mechanically coupling stress between adjacent layers of the at least three reinforcement layers to mitigate out-of-plane deformation of the matrix material while allowing deformation of the matrix material along the plane.

The microstructured composite material may further include a reinforcement member on at least one of the at least three reinforcement layers. The reinforcement member has an elongated shape and extends in a direction substantially parallel to the at least one of the at least three reinforcement layers.

The plurality of platelets may be arranged in a cellular pattern. The plurality of platelets may be arranged in a lattice pattern.

Each of the plurality of connecting members may have a straight section. Each of the plurality of connecting members may have a curved section.

The matrix material may be a variable elastic modulus material. The variable elastic modulus material may be selected from the group consisting of shape memory polymer, shape memory alloy, phase changing metal, wax, ice, plastically deforming material, electrorheological fluid, magnetorheological fluid, electrostrictive material, piezoelectric material, magnetostrictive material, ferromagnetic magnetostrictive material, magnetorheological elastomer, electrorheological elastomer, and liquid crystal elastomer.

The matrix material may be a constant elastic modulus material.

According to an embodiment of the present invention, a microstructured composite material with controlled deformation includes a matrix material and at least two reinforcement layers embedded in the matrix material. Each of the at least two reinforcement layers includes a plurality of support members. The support members of each layer of the at least two reinforcement layers extend substantially in parallel along a plane of the matrix material. The support members of a layer of the at least two reinforcement layers cross the support members of an adjacent layer of the at least two reinforcement layers. A plurality of connecting members interconnect the support members of adjacent layers of the at least two reinforcement layers at crossings between the support members. Two support members of the plurality of support members are pivotably interconnected by a corresponding one of the plurality of connecting members to mitigate translation between the two support members while allowing rotations between the two support members along the plane.

The plurality of connecting members may be pins.

The at least two reinforcement layers may include at least three reinforcement layers, and the support members of alternate layers of the at least three reinforcement layers extend in the same direction.

The support members of a layer of the alternate layers may be offset from those of another layer of the alternate layers in a direction along the plane.

According to an embodiment of the present invention, a microstructured composite material with controlled deformation includes a matrix material and at least two reinforcement layers embedded in the matrix material. Each of the at least two reinforcement layers includes at least two platelets arranged along a plane of the matrix material. A first connecting member extends along the plane and interconnects two of the at least two platelets of a first layer of the at least two reinforcement layers. A second connecting member extends along the plane and interconnects two of the at least two platelets of a second layer of the at least two reinforcement layers. The second layer is adjacent to the first layer. The second connecting member crosses and interlocks with the first connecting member to mitigate translation between the first connecting member and the second connecting member while allowing rotation between the first connecting member and the second connecting member along the plane.

According to an embodiment of the present invention, a microstructured composite material with controlled deformation includes a matrix material and at least one reinforcement layer embedded in the matrix material. The at least one reinforcement layer includes a plurality of support members arranged in a pattern along a plane of the matrix material. Each of the plurality of support members includes a first support member, a second support member and a third support member. The first support member has a protrusion extending from a surface of the first support member and a first edge. The second support member faces the first support member and is structured to receive the protrusion. The second support member has a second edge. The third support member is pivotably connected between the first support member and the second support member, and has a third edge and an opening. The protrusion traverses the opening. The third support member is configured to be blocked from pivoting around the protrusion in at least one direction when the third edge is in contact with the first edge and the second edge.

The first support member may include a fourth edge, the second support member may include a fifth edge, the third support member may include a sixth edge. The third support member may be configured to be blocked from pivoting around the protrusion in a direction different from the at least one direction when the sixth edge is in contact with the fourth edge and the fifth edge.

The protrusion may have a plate shape, and the second support member may have a slot for receiving the protrusion.

BRIEF DESCRIPTION OF THE DRAWINGS

The accompanying drawings, together with the specification, illustrate exemplary embodiments of the present invention, and, together with the description, serve to explain the principles of the embodiments of the present invention.

DETAILED DESCRIPTION OF EXEMPLARY EMBODIMENTS

Detailed descriptions will be made below in reference to certain exemplary embodiments according to the present invention. The drawings and descriptions are to be regarded as illustrative in nature and not restrictive.

Embodiments of the present invention provide reconfigurable (or morphing) composite materials that provide highly controlled deformation and stiffness properties. The construction and operation of these materials with machine like properties macroscopically are enabled by utilizing machine like microstructures included in the material. Microscopic three dimensional (3D) structures are included in the materials to control their deformation and stiffness properties. Exemplary microscopic 3D features that may be included into the composite materials include bearing, ball and pin joints, and detents. The reconfigurable composite materials according to the embodiments of the present invention allow a range of new material properties to be enabled. These include highly segregated in-plane and out-of-plane stiffness properties that are highly desirable, for example, in morphing aircraft structure applications. Other desirable features include controllable non-linear stiffness properties for creating controllable soft and stiff properties and deformation locking.

Furthermore, the embodiments of the present invention improve on existing non-tailored materials for morphing structures such as variable stiffness composites using fibers or flat plate reinforcements by providing additional design freedoms to incorporate non-linear material properties. For example, the embodiments of the present invention incorporate machine-like elements at the microstructure level to carefully tailor the material properties to application requirements. This allows for a much improved control of material properties as compared to conventional composite materials. Furthermore, certain types of anisotropy in material properties such as in-plane and out-of-plane segregation that can be realized through the embodiments can not be achieved with conventional composite materials technology due to the lack of control over shape and mechanical coupling of reinforcements.

In reconfigurable composite material applications, there is often a need to allow large deformations and relatively small stiffness in one direction or orientation while permitting small deformations in another orientation. An example is the construction of morphing aircraft wings where the wings are designed to be stretched in a direction parallel to the plane of the wing, but it is required that the membrane deflection due to air pressure loading be minimized. The exemplary embodiments of the present invention described below provide some configurations that may be applied to construct morphing aircraft wings, however, the present invention is not limited thereto.

Figure 1A:
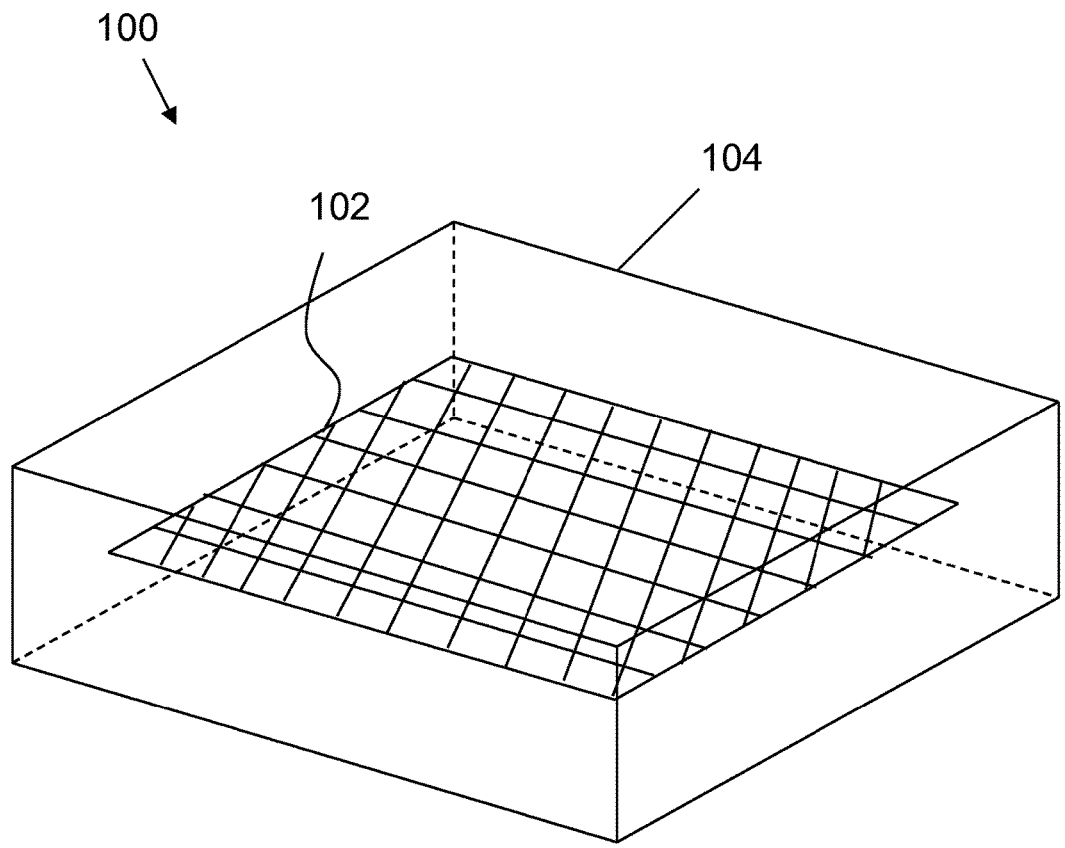
FIG. 1A is a drawing illustrating a schematic perspective view of a composite material. including a reinforcement layer according to an embodiment of the present invention.

FIG. 1A is a drawing illustrating a perspective view of a composite material 100 according to an embodiment of the present invention. The composite material 100 includes a plurality of reinforcement layers 102 embedded in a matrix material 104. In some embodiments, the reinforcement layers 102 include at least three layers.

Figure 1B:
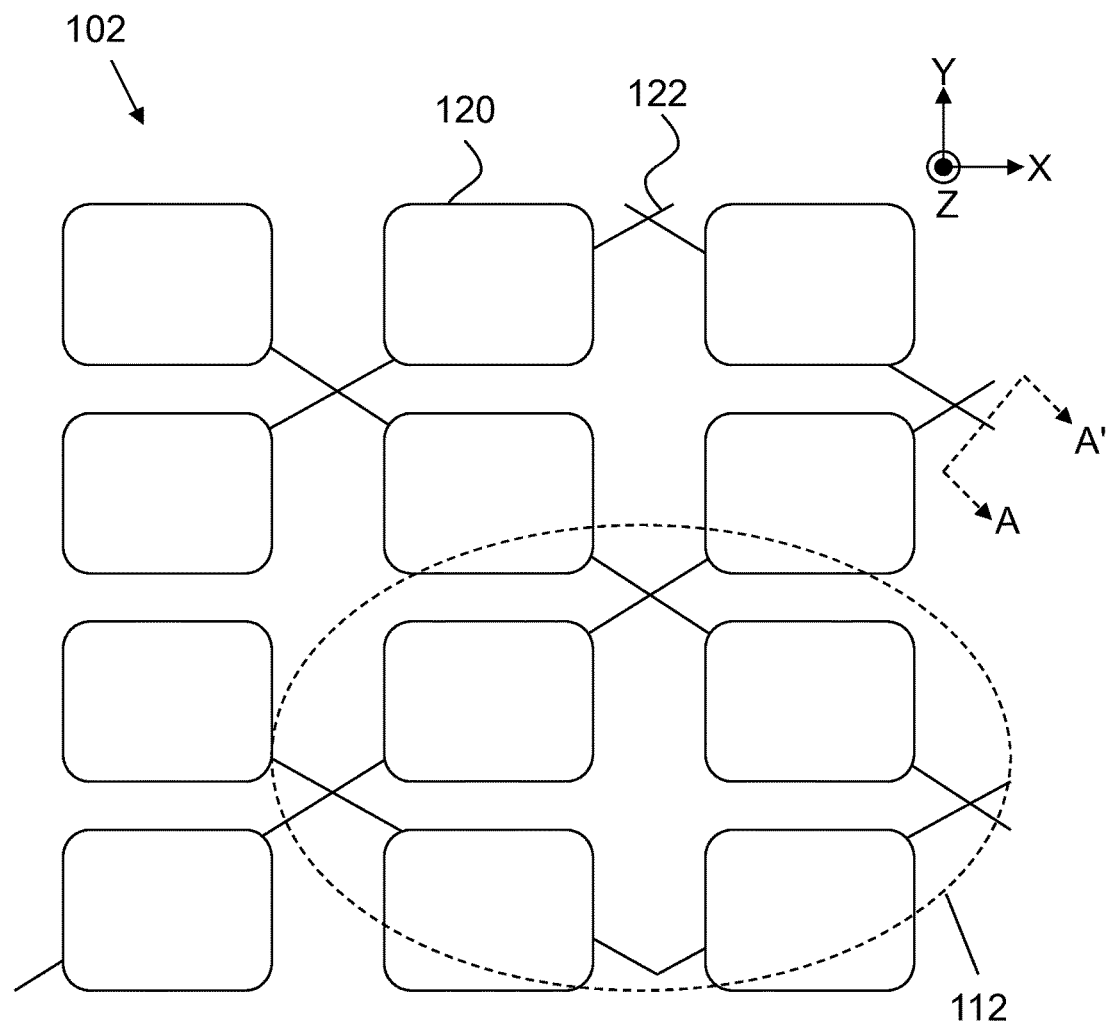
FIG. 1B is a drawing illustrating a plan view of a design of a reinforcement layer of a composite material according to an embodiment of the present invention.
Figure 2:
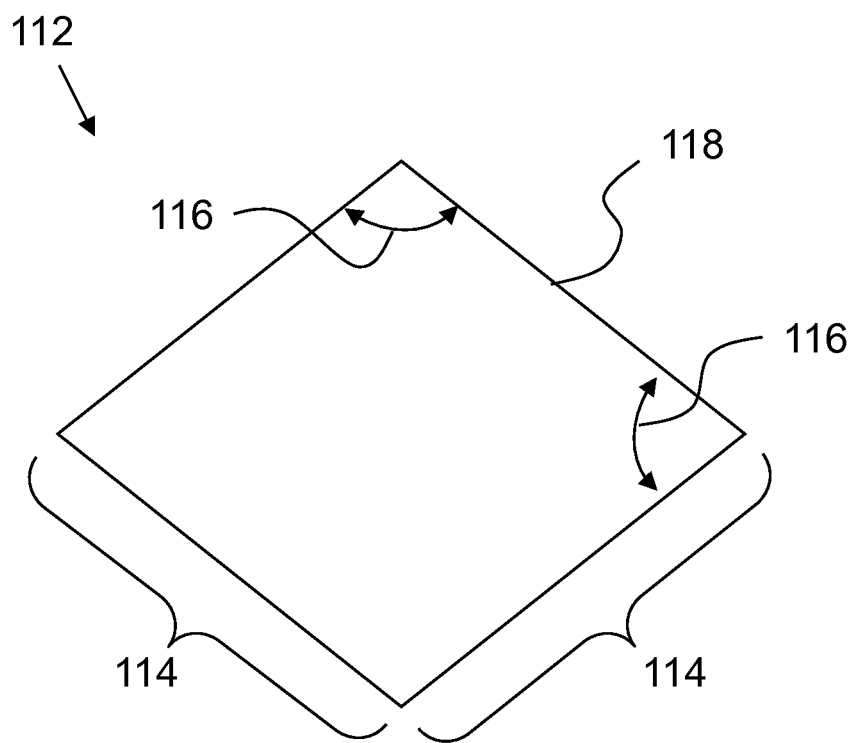
FIG. 2 is a simplified view of a section of the reinforcement layer shown in FIG. 1B.

FIG. 1B, according to an embodiment of the present invention, illustrates a design for a layer of the reinforcement layers 102 that can be used to construct a reconfigurable composite material designed for discriminating in-plane loading from out-of-plane loading. In the composite material 100, several reinforcement layers 102 may be stacked on top of each other with suitable offsets in the in-plane directions to achieve desirable stiffness properties. The reinforcement layers 102 are connected through their thickness by the matrix material 104 that allows for shear stress transfer between the reinforcement layers 102. Each of the reinforcement layers 102 has been optimized for shear loading. In some cases, this may be accomplished using a shear frame. For the ease of description, a simplified representation of a shearing frame 112 is shown in FIG. 2, where the boundaries 114 of the shearing frame 112 are kept at constant length, and the angles 116 between the frame members 118 are altered to achieve a change in shape and area of the shearing frame 112.

In FIG. 1B, each of the reinforcement layers 102 includes a network of platelets 120 as support members and ligaments 122 for connecting the platelets 120. The design of the platelets 120 and the ligaments 122 may follow from design of cellular materials and compliant mechanisms. See, Gibson, L., Ashby, M., *Cellular Solids: Structure & Properties*, Pergamon Press, New York, 1988; and Howell, Larry, *Compliant Mechanisms*, John Wiley and Sons, New York, 2001; the entire contents of both references are incorporated by reference herein.

Figure 1C:
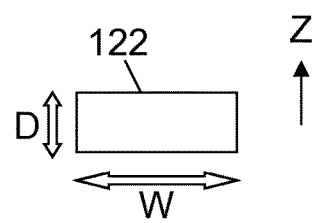
FIG. 1C is a drawing illustrating a cross sectional view of one of the ligaments shown in FIG. 1B.

FIG. 1C is a drawing illustrating a cross sectional view of one of the ligaments shown in FIG. 1B.

Figure 3:
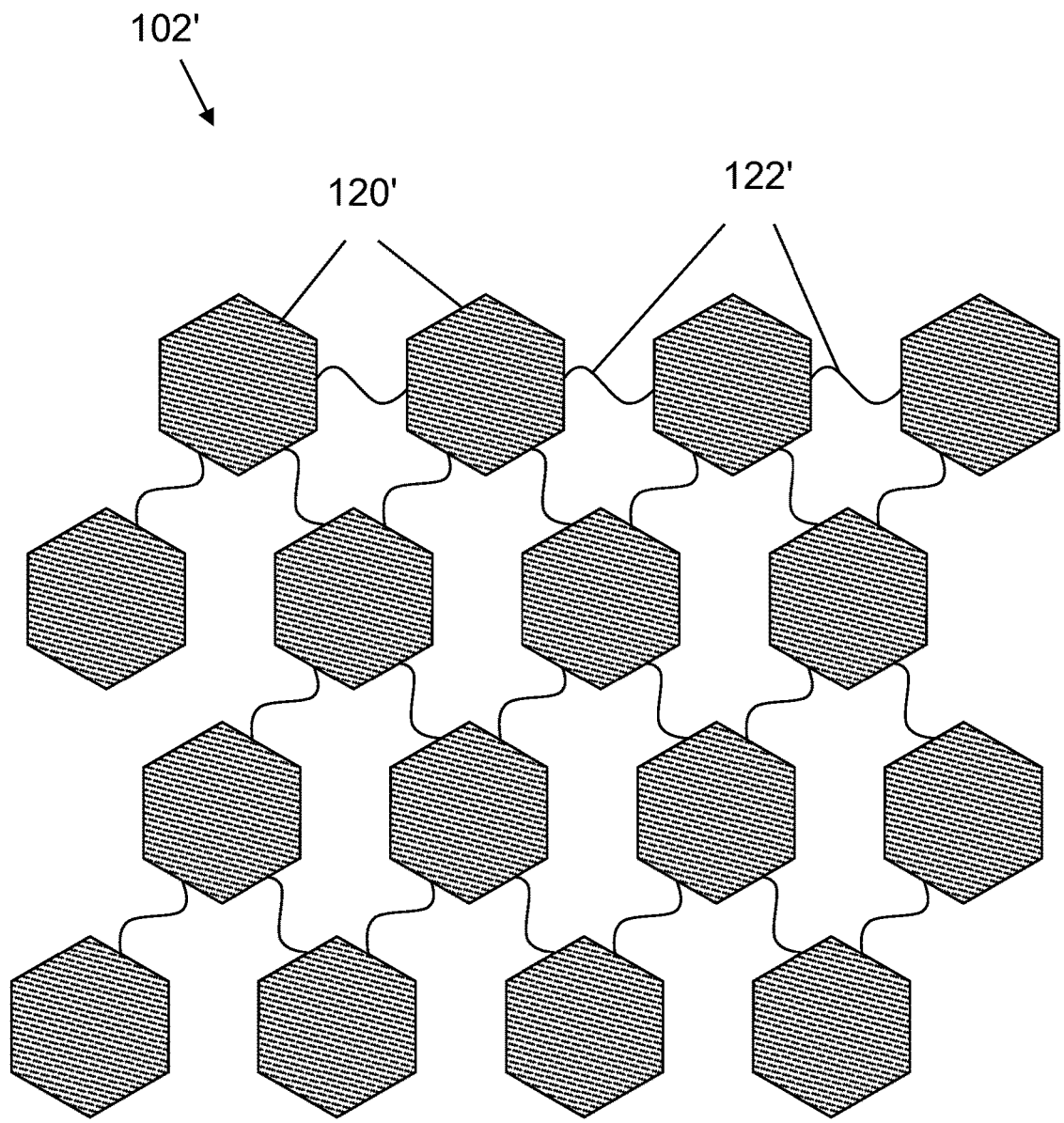
FIG. 3 is a drawing illustrating a plan view of a reinforcement layer according to an embodiment of the present invention.

Both the platelets 120 and the ligaments 122 may be of arbitrary shape, and different designs provide for different stiffness and strain capacity. The ligaments 122 should provide high stiffness in tension, but may bend easily and reversibly to reduce the likelihood that the composite material 100 may undergo plastic or irreversible deformation. Referring to FIG. 1C, it shows a cross sectional view of one of the ligaments 122 across the line A-A'. In some embodiments, the ligaments 122 may have a high aspect ratio beam structure where the aspect ratio is defined as the thickness in the width direction (W) divided by the depth direction (D) as shown in FIG. 1C. In some embodiments according to the present invention, the aspect ratio may be at least 1 (i.e., a square cross section) and may be as high as 4-10. Using isotropic etching processes and metals such as steel, aluminum or copper; aspect ratio approximately 2.5:1 may be achieved that allows a great deal of flexibility of the ligaments 122 using in-plane bending. Other compatible processes such as laser cutting or water jet machining may provide larger aspect ratios. The shape of the ligaments 122 may also be a design variable. FIG. 3 shows an exemplary reinforcement layer 102' according to an embodiment of the present invention with curved ligaments 122'. A straight ligament may be bent into a curve ligament using external forces and locally compressive strains. The initially curved ligament 122' allows straightening in response to external loads and may respond flexibly to either tension or shear loads.

Referring back to FIGS. 1A-1B, the design of the platelets 120 is a balance between the needs of deformation and stiffness of the composite material 100. The higher the deformation, the more open matrix space should be included in the composite material 100, while stiffness may be increased by volume fraction. The shape of the platelets 120 and the arrangement of the platelets 120 (e.g., a cellular or lattice pattern) are driven by the type of deformation that is necessary and particularly the Poisson ratio of deformation needed. A composite material constructed with multiple layers of the exemplary reinforcement layer 102 shown in FIG. 1B is effective for shearing loads. Other types of loads such as compression or tension with Poisson ratio ranging from −0.5 to >1 may be accommodated using various types of arrangements of the platelets and ligaments. The design of such material can be based on cellular materials design in which a variety of Poisson ratios have been demonstrated by altering the basic cell dimensions. See, L. Gibson and M. Ashby. In general, one design consideration is to maximize the area fraction of the reinforcement platelets 120 to achieve increased stiffness and strength while still permitting the desired deformation of the composite material 100. For example, the use of triangular, rectangular, hexagonal symmetries may allow for a wide variety of mechanical properties and angular dependencies to be achieved.

In some embodiments of the present invention, the ligaments 122 may also be made for a non-load bearing function that serves to maintain spacing and separation of the platelets 120 during fabrication. In these embodiments, it may be desired that the platelets 120 be connected physically with little to no force once the composite material is fabricated. The ligaments 122 should be sturdy enough, however, to maintain the shape and layout of the platelets 120 during fabrication steps. Exemplary designs of the ligaments 122' are curved members (shown in FIG. 3) with relatively high aspect ratio such that the bending stiffness of the ligament 122' itself is low, and such that the effective physical axial connectivity of the platelets 120 is weak. This allows the platelets 120 to behave independently once the composite material 100 is fabricated. FIG. 3 shows one non-limiting example of this type of ligament design to connect an array of hexagonal platelets 120'. Many other designs may provide similar functionality including straight sections with nodes (shape of V or W), serpentine shapes, ring type springs, and others. Another benefit of this approach is that it allows the platelets 120 to be electrically connected through the ligaments 122 while physical coupling among the platelets 120 are mainly provided through the shear stress of the matrix material. This benefit may be useful in applications where it is desirable to maintain an electrical connectivity through out the composite material such as is necessary for protection from lightning strike or for purposes of reflection of electromagnetic waves.

Figure 4:
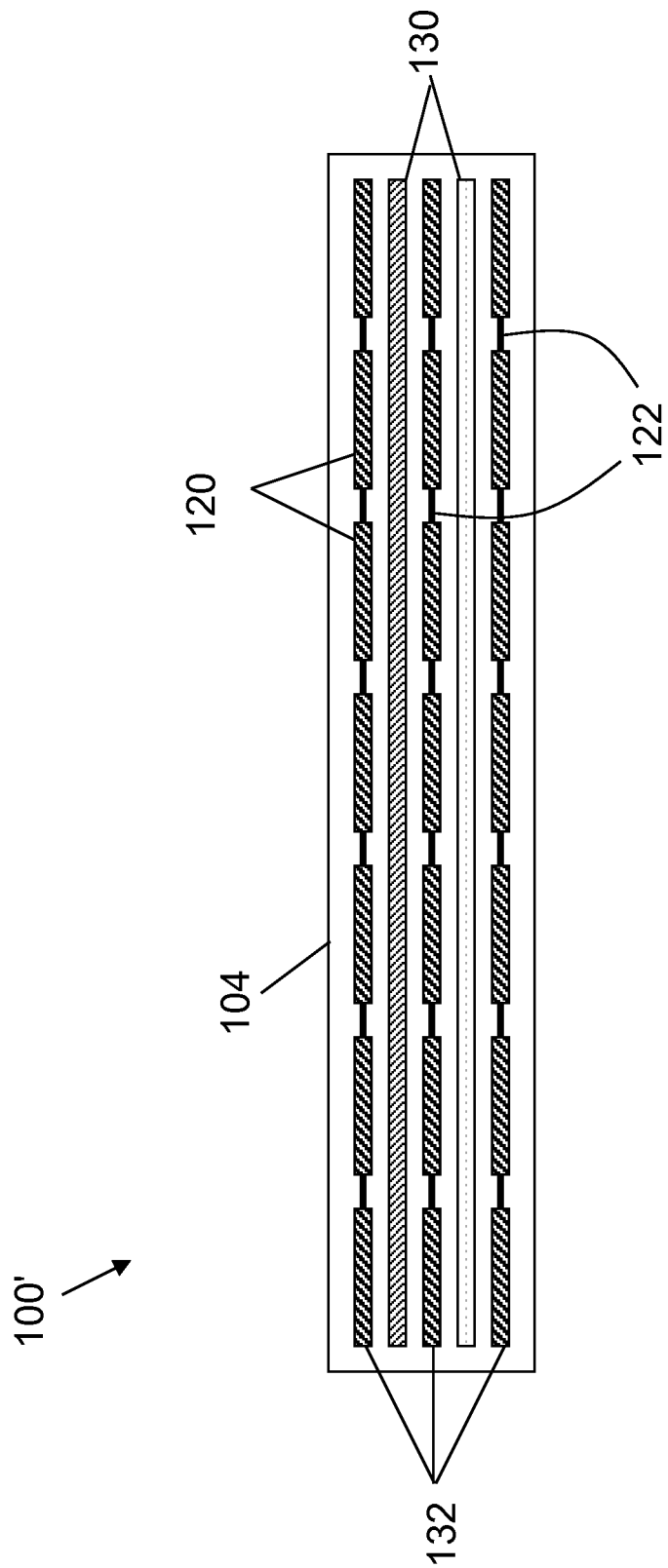
FIG. 4 is a cross sectional view of a composite material according to an embodiment of the present invention.

FIG. 4 shows a cross sectional view of a composite material 100' with long thin reinforcement members 130 incorporated over the ligaments 122 connecting the platelets 120 in multiple reinforcement platelet layers 132 according to another embodiment of the present invention. The long reinforcement members 130 that span the frame 112 and have orientation parallel to one set of the frame members 118 may be included in the embodiment. The reinforcement platelet layers 132 and the reinforcement members 130 (e.g., a long thin cable) are alternated through the thickness of the composite material 100'. The matrix material 104, e.g., a shape memory polymer (SMP), may surround all of the reinforcement elements including the platelets 120, the ligaments 122 and the reinforcement members 130.

The matrix material 104 may be a non-variable elastic modulus material (i.e., always flexible with a constant elastic modulus) or variable elastic modulus material. Suitable non-limiting exemplary non-variable elastic modulus material includes members of the elastomer family of amorphous polymers used above their glass transition temperature. Examples include Natural Rubber (NR), Synthetic Polyisoprene (IR), Butyl rubber (copolymer of isobutylene and isoprene, IIR), Halogenated butyl rubbers (Chloro-butyl Rubber: CIIR; Bromobutyl Rubber: BIIR), Polybutadiene (BR), Styrene-butadiene Rubber (copolymer of polystyrene and polybutadiene, SBR), Nitrile Rubber (copolymer of polybutadiene and acrylonitrile, NBR), also called Buna N rubbers, Hydrogenated Nitrile Rubbers (HNBR) Therban and Zetpol, Chloroprene Rubber (CR), polychloroprene, Neoprene, Baypren, EPM (ethylene propylene rubber, a copolymer of ethylene and propylene) and EPDM rubber (ethylene propylene diene rubber, a terpolymer of ethylene, propylene and a diene-component), Epichlorohydrin rubber (ECO), Polyacrylic rubber (ACM, ABR), Silicone rubber (SI, Q, VMQ), Fluorosilicone Rubber (FVMQ), Fluoroelastomers (FKM, and FEPM) Viton, Tecnoflon, Fluorel, Aflas and Dai-El, Perfluoroelastomers (FFKM), Tecnoflon PFR, Kalrez, Chemraz, Perlast, Polyether Block Amides (PEBA), Chlorosulfonated Polyethylene (CSM), (Hypalon), Ethylene-vinyl acetate (EVA), Thermoplastic elastomers (TPE), and Thermoplastic Vulmayizates (TPV), for example Santoprene TPV, Thermoplastic Polyurethane (TPU), Thermoplastic Olefins (TPO).

Exemplary suitable variable stiffness materials for the matrix material 104 include shape memory polymers, shape memory alloys, phase changing metals, wax, ice, plastically deforming materials, electrorheological fluids, magnetorheological fluids, electrostrictive materials, piezoelectric materials, magnetostrictive materials, ferromagnetic magnetostrictive materials, magnetorheological elastomers, electrorheological elastomers, and liquid crystal elastomers. Each of these potential materials brings a different set of properties that influence the ultimate functionality of the composite material. For example, some materials such as shape memory polymers and wax provide very high strain capacity to enable large deformations in the material, while others provide small deformations but very rapid stiffness tuning such as piezoelectric and magnetostrictive materials.

Figure 5A:
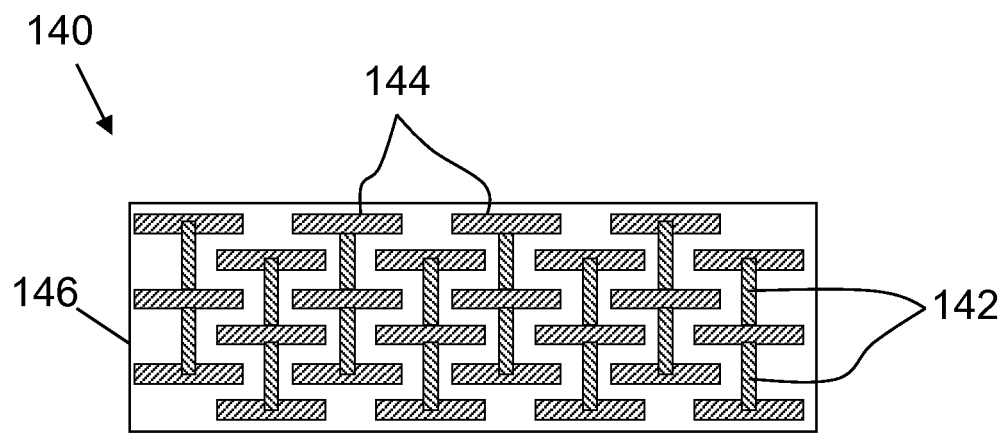
FIGS. 5A-5C are drawings showing cross sectional views of a composite material having through thickness mechanical connections according to an embodiment of the present invention.
Figure 5B:
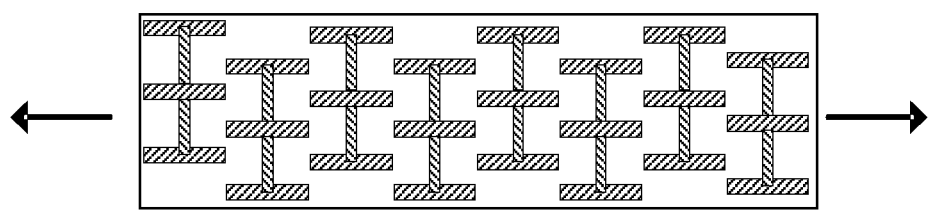
Figure 5C:
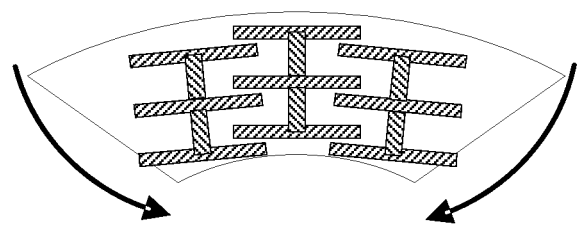

In another embodiment according to the present invention, the resistance to out-of-plane deformation of thin plate members subject to out-of-plane pressures may be increased by the use of through thickness mechanical connections such as pins and holes or slots. Suitable holes or slots are formed on adjacent overlapping thin plate members which are coupled together by receiving the pins in the thickness direction. That is, these pins mechanically couple the adjacent overlapping layers. FIGS. 5A-5C show the concept for the through thickness mechanical connections in a rectangular platelet reinforcement composite material 140. The through thickness connectors (e.g., pins) 142 in FIGS. 5A-5C may be circular pins that are mated to circular sockets in the vertically aligned platelets 144. The connectors 142 may be of other shapes including, for example, rectangular or triangular in order to alter the relative bending and twist resistance of the stacks of platelets 144 connected by the connectors 142. The structure shown in FIGS. 5A-5C limits the non-symmetric displacement of the platelets 144 through the thickness of the material as is typically encountered in bending or membrane deformation.

By providing through thickness linking between the platelets 144, antisymmetric deformation where the platelets 144 must translate or rotate in opposite directions through the thickness of the material is locked out. However, the platelets 144 are relatively free to displace together to accommodate stretching relatively easily because the connectors 142 will not significantly affect the in-plane properties of the reinforcement composite material 140.

Figure 7A:
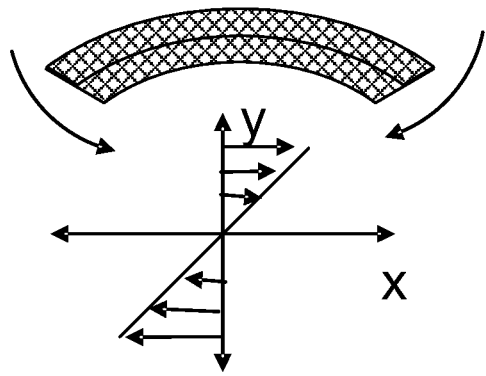
FIGS. 7A-7B are drawings illustrating the strain distribution through a beam or plate member subject to bending and axial stretching.
Figure 7B:
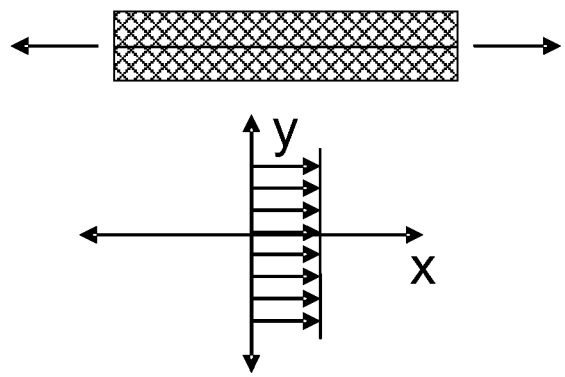

In practice, one must consider the strain distribution through a beam or plate member subject to bending and axial stretching as illustrated in FIGS. 7A-7B, respectively. In the case of bending (e.g., membrane bulging) shown in FIG. 7A, the strain is anti-symmetric about the neutral axis (e.g., X-axis in FIG. 7A) of the material. In the case of purely axial loading shown in FIG. 7B, strain is generally symmetric about the midplane of the material, and therefore symmetric about the neutral axis (e.g., X-axis in FIG. 7B). If one aspires to prescribe difference in stiffness of a material in response to bending and axial loads, such as in morphing applications, it is necessary to control the kinematics of the material to respond differently to symmetric and antisymmetric strain loads.

Figure 6A:
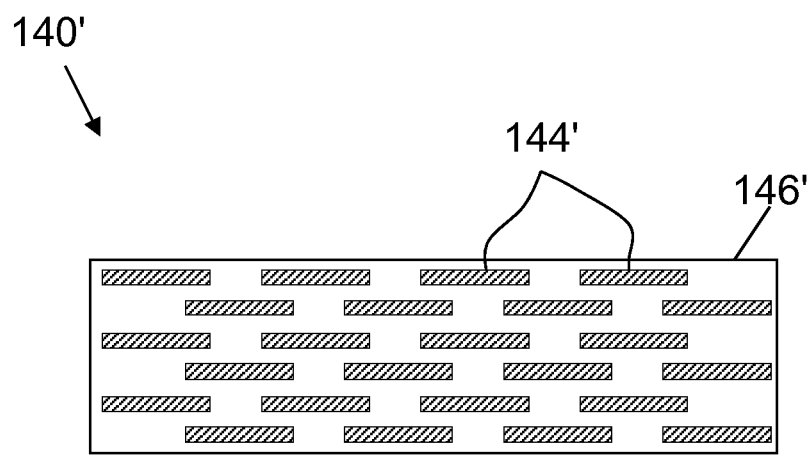
FIGS. 6A-6C are drawings showing cross sectional views of a composite material having non-connected platelets.
Figure 6B:
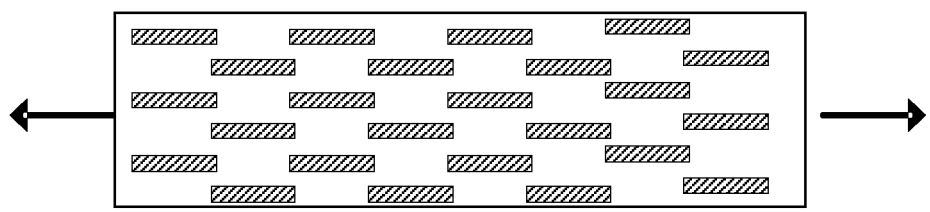
Figure 6C:
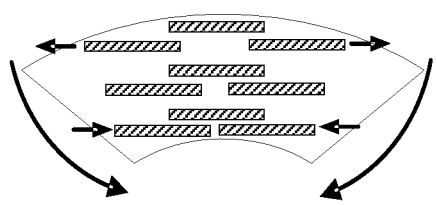

Referring back to FIGS. 5A-5C, therefore, by linking the platelets 144 in the composite material 140 through the thickness, a difference in the local stiffness is achieved by changing the deformation kinematics of the composite material 140. FIGS. 5A-5C and FIGS. 6A-6C illustrate the differences in behavior for the linked and non-linked plate systems for bending and stretching. As shown, stretching behavior is similar as shown in FIGS. 5B and 6B, but bending behavior is much different as shown in FIGS. 5C and 6C. As shown in FIG. 6C, the non-connected platelets 144' may accommodate bending by moving together on the compressive side and apart on the tensile side. However, the connected platelets 144 in FIG. 5C may only rotate to accommodate the bending motion, which is a much higher energy deformation process due to the relative incompressibility of the matrix material 146. By providing through thickness linking, the antisymmetric deformation mode may be locked out and the platelets 144 translate or rotate in opposite directions through the thickness of the composite material 140. However, the platelets 144 are free to displace in unison to accommodate stretching relatively easily.

In FIGS. 5A-5C, the matrix material 146 of the composite material 140 plays an important role. In conventional platelet composites such as the example shown in FIGS. 6A-6C, the composite material 140' gains its stiffness and strength through the transfer of load from one reinforcement member (e.g., platelets 144') to another through shear of the matrix material 146'. The stiffness of the matrix material 146' will determine the compliance of this connection and to some extent the overall stiffness of the composite material 140'. Therefore, the construction described in reference to FIGS. 5A-5C may benefit from the use of variable stiffness matrix materials, such as shape memory polymers, phase transition materials such as wax and low melting temperature metals, where a high stiffness matrix state provides good mechanical rigidity, and a low stiffness state provides good strain and deformation capacity necessary for shape changing operations like morphing. Alternatively, due to the discrimination of in-plane and out-of-plane properties (e.g., stiffness), the composite material 140 may include low stiffness matrix materials such as elastomers (e.g., silicone, EPDM, urethane, etc) as its matrix material 146. These matrix materials allow large shear strains, and therefore would provide for large deformation strain suitable for structural shape changing applications.

The embodiment shown in FIGS. 5A-5C limits the rotation of the platelet stacks 148, as would be experienced during bending or membrane type deformations. The connectors (e.g., pins) 142 do not significantly affect the in-plane properties of the composite material 140. Therefore the ratio of in-plane stiffness to out-of-plane (e.g., bending) stiffness may be significantly increased.

The construction shown in FIGS. 5A-5C may be achieved using metallic reinforcement layers such as aluminum, steel, titanium and the like. These metallic layers may be processed using photolithographic etching techniques such as differential or timed etching. Mechanical processes such as punch and stamping may also provide similar types of features in metal sheets. Other methods that may be suitable are positive deposition methods such as laser sintering. The design of the connectors 142 (e.g., pins, posts) including length, size, aspect ratio is tailorable to some extent using suitable manufacturing techniques. The connectors 142 should provide connectivity between the platelets 144 and restrict their motion laterally, and therefore should be sufficiently stiff and strong to manage this function. In some embodiments, the connectors 142 may be hollow (e.g., a tube).

Figure 8A:
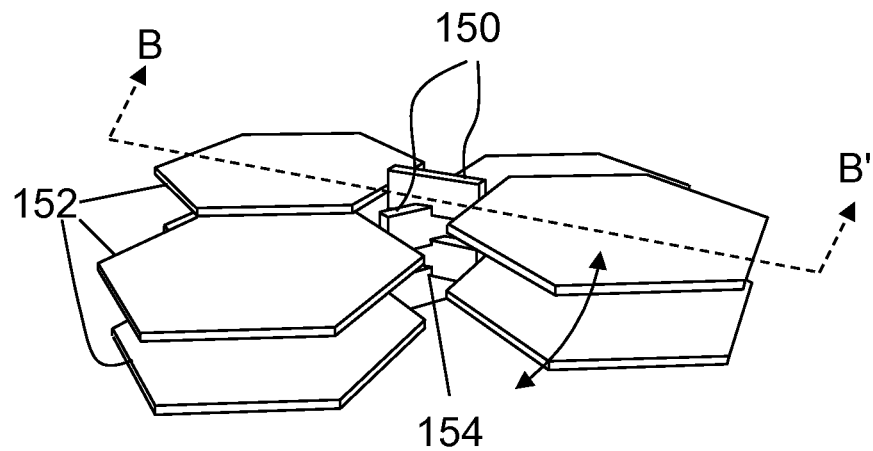
FIGS. 8A-8B are drawings in perspective views illustrating reinforcement layers of a composite material according to an embodiment of the present invention incorporating interlocking joints between platelets.
Figure 8B:
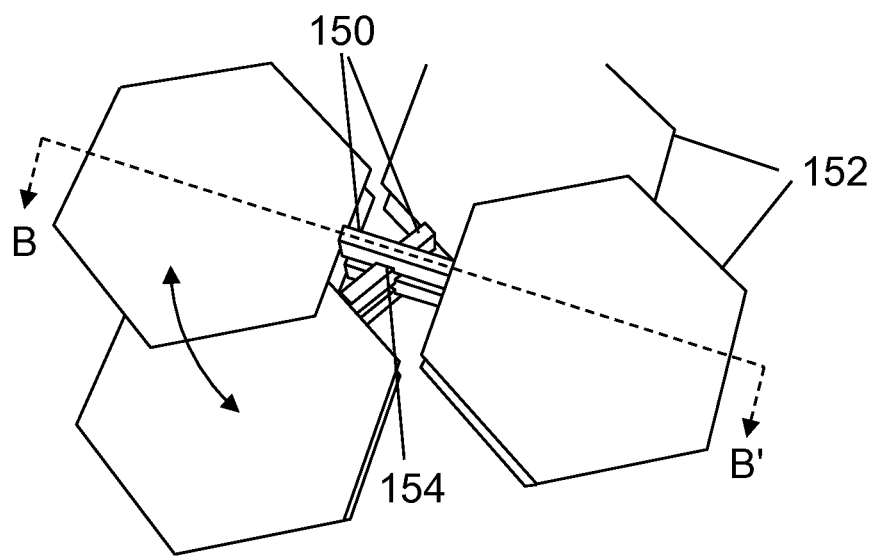
Figure 8C:
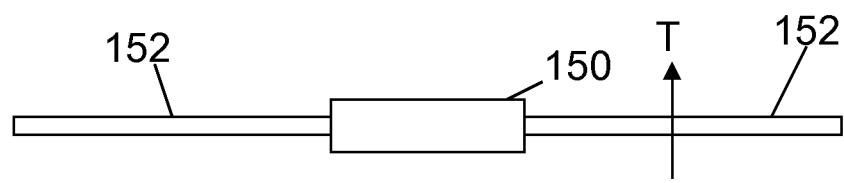
FIG. 8C is a drawing illustrating a cross sectional view of a reinforcement layer illustrated in FIGS. 8A-8B.

FIGS. 8A-8B show fundamental unit cells of reinforcement layers of a composite material according to an embodiment of the present invention incorporating interlocking joints between platelets in two different perspective views. FIG. 8C shows a cross sectional view of the unit cells shown in FIGS. 8A-8B along the line B-B'.

In the embodiment shown in FIGS. 8A-8B, ligaments 150 (or connecting members) with a suitably high aspect ratio connect platelets 152 in the thickness direction. The direction T in FIG. 8C indicates the thickness direction. This type of connection will allow the platelets 152 to rotate in direction along the plane but not translate in response to bending loads. The rotation is enabled, for example, by the bending of the ligaments 150 about the intersection point, and therefore, the amount of rotation allowed is determined by the aspect ratio (e.g., slenderness) of the ligaments 150. In the embodiment shown in FIGS. 8A-8B, successive layers of reinforcement platelets 152 are joined through the thickness using overlapping joints 154. These overlapping joints 154 may be created using etching techniques or via stamping and punch techniques. The overlapping joints 154 couple the translation of the platelets 152 while allowing rotation of the platelets 152 in successive layers. The embodiment may be useful in generating a shear type loading while increase the out-of-plane stiffness because membrane deflections require that layers through the thickness direction translate with respect to one another.

Figure 9A:
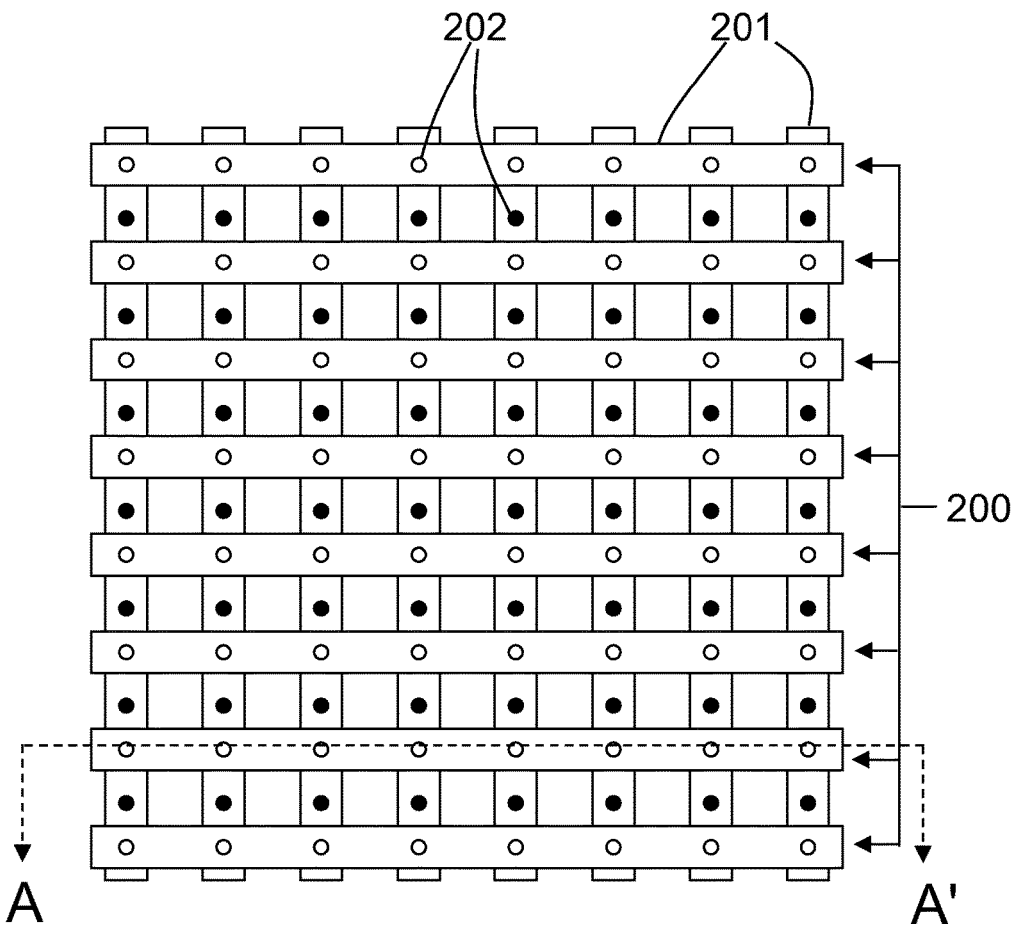
FIGS. 9A-9B are drawings in plan view and cross sectional view, respectively, illustrating through thickness connected reinforcement layers according to an embodiment of the present invention.
Figure 9B:
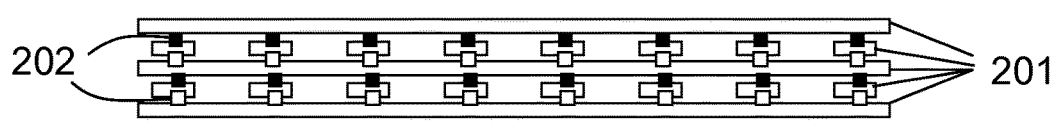

FIGS. 9A-9B are drawings in plan view and cross sectional view, respectively, illustrating through thickness connected reinforcement layers according to an embodiment of the present invention.

FIGS. 9A-9B illustrate an embodiment of through thickness connected reinforcement layers of a composite material that have high shear deformation capacity, combined with high resistance to out-of-plane bending loads. The embodiment shown in FIGS. 9A-9B utilizes a geometry with high aspect ratio intersecting members that are pinned into each other to provide essentially one degree of freedom for morphing and shape changing operations. By connecting the members with, for example, pin joints, a much different local kinematics is achieved than is possible with fiber composite layers. This is because of the constraining effect of the pin joints on the kinematics of the reinforcement system. It should be appreciated that these pin joints are small in the sense that there are many joints per unit thickness of the composite material. This scale discriminates the composite material from previously established technologies at the macro scale such as lattice networks and the like.

FIG. 9A shows two reinforcement layers according to an embodiment of the present invention. FIG. 9B shows a cross sectional view showing five reinforcement layers according to an embodiment of the present invention. Each of the reinforcement layers shown in FIGS. 9A-9B includes a plurality of reinforcement elements 201 extending in parallel. In FIG. 9A, the reinforcement elements 201 of the top layer 200 of the two reinforcement layers extend in a horizontal direction. The reinforcement elements 201 of the bottom layer of the two reinforcement layers extend in a vertical direction. As such, the embodiment shown in FIGS. 9A-9B includes a lattice of reinforcement elements 201 (or support members) where nodes 202 at crossings of the reinforcement elements 201 are connected by, for example, pin connectors that allow rotation of the reinforcement elements 201 relatively freely, but restrict translation of the reinforcement elements 201. The embodiment of FIGS. 9A-9B permit shearing deformation but restricts deformation in other dimensions. Although FIGS. 9A-9B show only the lattice of reinforcement elements 201, the reinforcement elements 201 will be surrounded by a matrix material that exhibits a phase change such as a shape memory polymer, wax, or elastic materials (e.g., rubbers and silicones). This provides the lateral stiffness and locks the kinematics mechanism into place. However, one skilled in the art would appreciate that other suitable types of matrix materials may be applied.

Referring to FIG. 9A, in practice, multiple reinforcement layers overlapping each other and laminated through the thickness may be used. FIG. 9B is a cross sectional view of the embodiment shown in FIG. 9A along the line A-A' showing multiple layers of overlapping reinforcement layers. By increasing the number of reinforcement layers, the thickness of a composite material may be increased and additional load can be supported. Furthermore, the bending stiffness in this embodiment can be increased if the reinforcement layers are all coupled through the thickness. Furthermore, the reinforcement elements 201 may be non-uniform in shape along their length direction such as wavy or saw tooth patterns to further adjust the local strain generated in the matrix phase of a composite material including the reinforcement layers during deformations. In some embodiments, at least three overlapping reinforcement layers are provided.

Figure 9C:
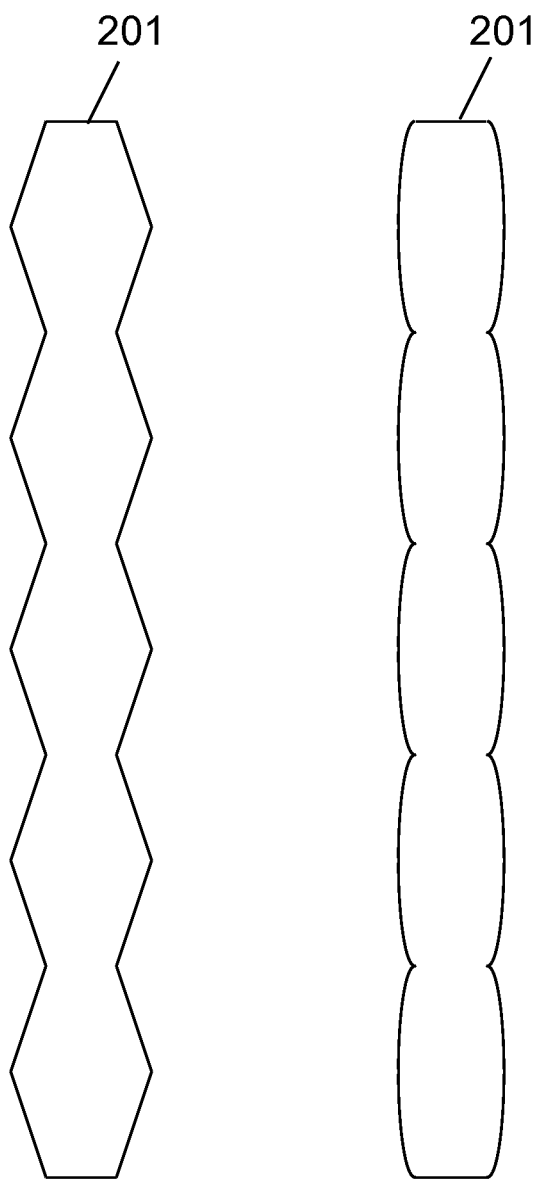
FIG. 9C is a drawing illustrating two exemplary reinforcement elements according to embodiments of the present invention.

FIG. 9C is a drawing illustrating two exemplary reinforcement elements with wavy and saw tooth shapes according to other embodiments of the present invention.

Figure 10A:
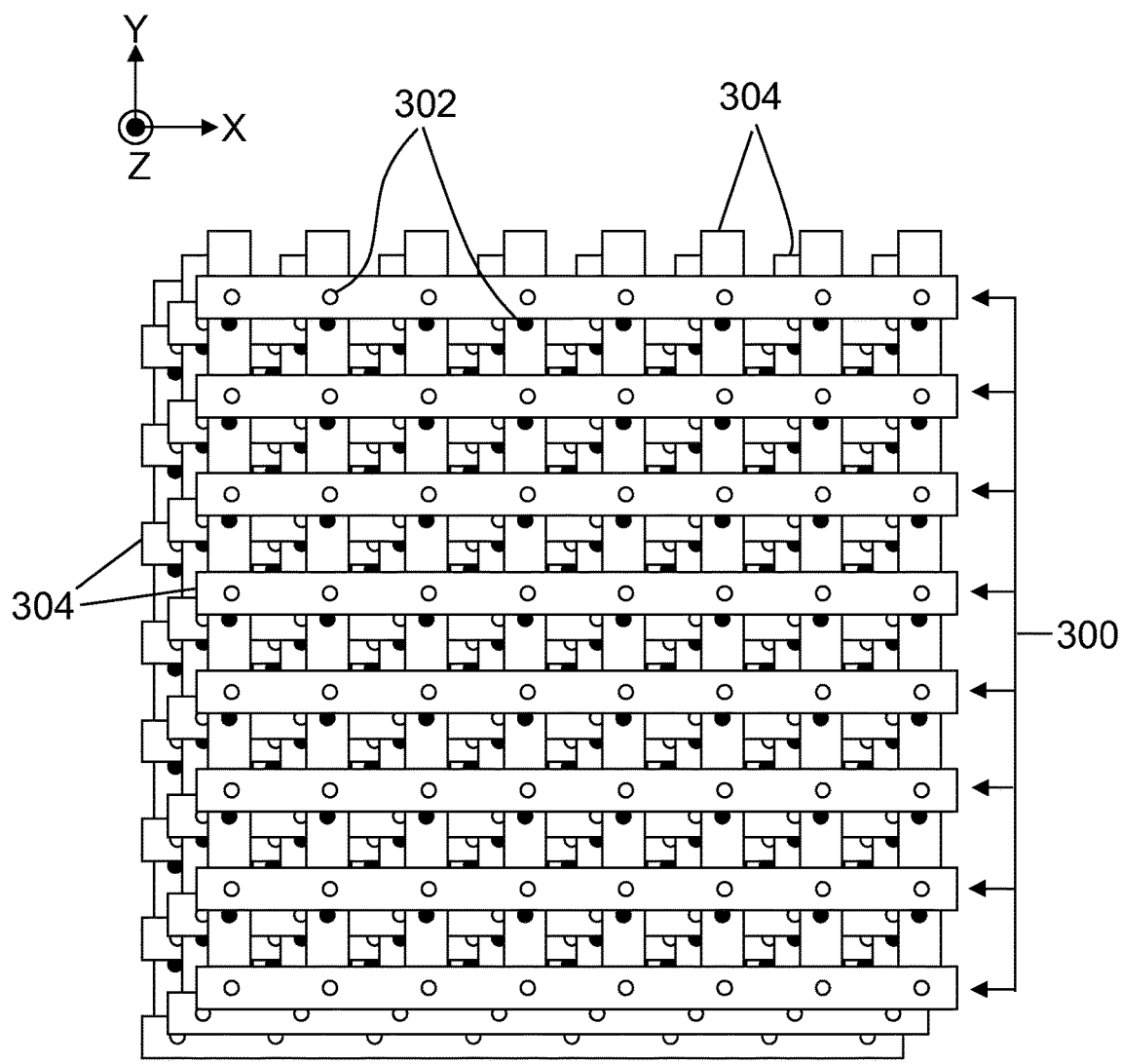
FIGS. 10A-10B are drawings in plan view and cross sectional view, respectively, illustrating through thickness connected reinforcement layers according to another embodiment of the present invention.
Figure 10B:
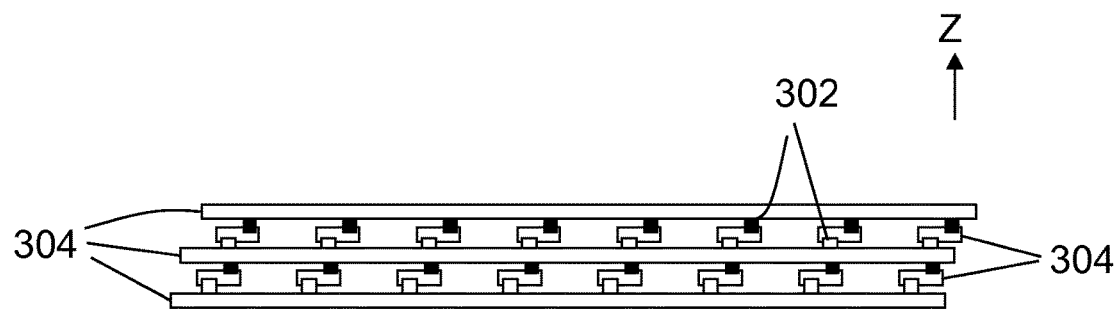

FIGS. 10A-10B illustrate an embodiment of a composite material with multiple reinforcement layers, each layer including a plurality of reinforcement elements 304 extending in parallel, the reinforcement layers staggered through the thickness to achieve a less permeable, higher and more uniform stiffness behavior. For example, the top reinforcement layer 300 includes reinforcement elements 304 extending in a horizontal direction. This embodiment may be employed in aero structures, for example, where a pressure is loaded onto the surface of a composite material including the reinforcement layers. In order to stagger the reinforcement layers, pins 302 may be located at different locations in successive layers. In some embodiments, each of the reinforcement layers acts independently as a shearing frame, but the reinforcement layers also are coupled through the shear stress generated in a matrix material embedding or enclosing the reinforcement layers during loading as in conventional fiber and platelet composite materials. In other embodiments, there is not a pin 302 at every crossing to reduce the number of pins 302 per crossing. Reducing the number of pins 302 may increase the flexibility of the composite material and allow it to accommodate more strain and the effects of non-ideal boundary conditions. The flexibility of the reinforcement elements 304 may also be adjusted by utilizing architecturally compliant shapes such as wavy strips or textured strips.

Figure 10C:
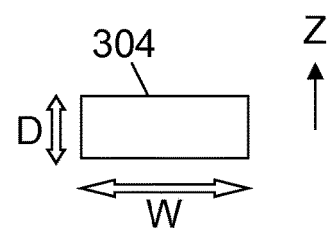
FIG. 10C is a drawing illustrating a cross sectional view of a reinforcement element shown in FIGS. 10A-10B.

Additional variations of the size and design of the shapes of the reinforcement elements 304 include repeating hourglass shapes, platelets with connecting ligaments, discreet platelets, etc. As mentioned above, certain materials may increase performance of the reinforcement layers when the reinforcement members 304 have mechanical compliance incorporated, for example, as in corrugations. Also, the aspect ratio of the reinforcement elements 304 may be altered to be either wider or thinner as required. FIG. 10C is a drawing illustrating a cross sectional view of a reinforcement element shown in FIGS. 10A-10B. The aspect ratio of the reinforcement element 304 is defined as the ratio of the width (W) to the depth (D) of the cross section of the reinforcement element 304 as shown in FIG. 10C. In addition, overlapping of the reinforcement layers provide a sliding plate action during the shearing of a composite material incorporating the reinforcement layers. This may be used to make the composite material impermeable and suitable for operation such as a morphing wing skin or other components with pressure loading during large deformations.

FIGS. 11A-11E are drawings illustrating a reinforcement layer according to an embodiment of the present invention.

Figure 11A:
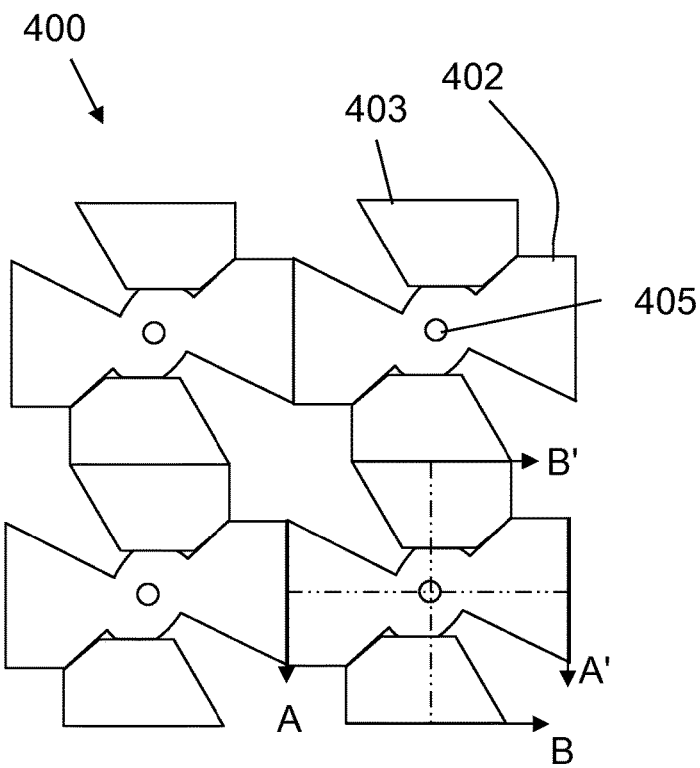
FIGS. 11A-11E are drawings illustrating a reinforcement layer according to an embodiment of the present invention.
Figure 11B:
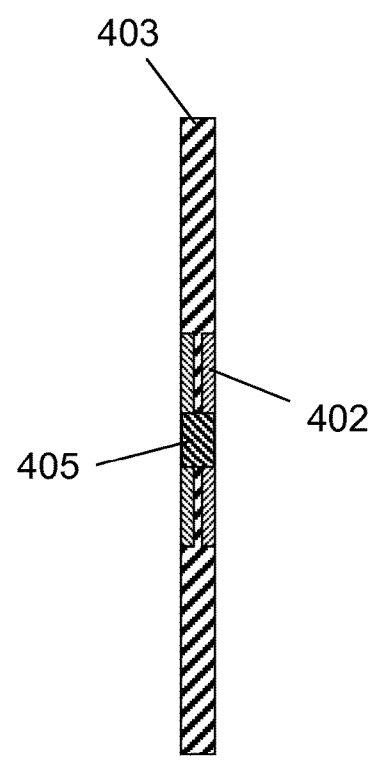
Figure 11C:
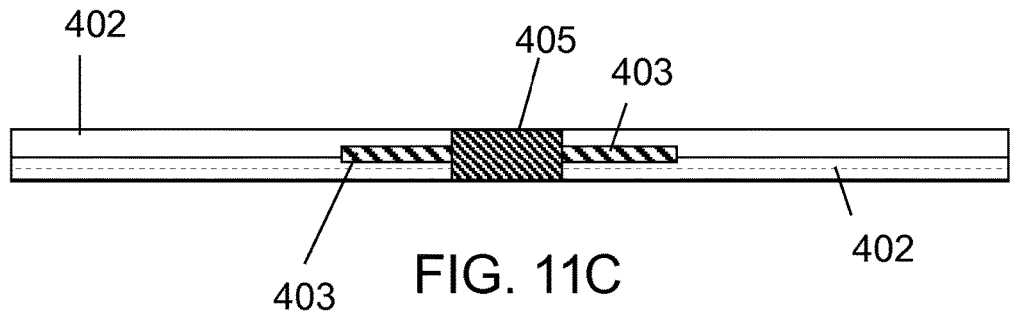

FIGS. 11A-11C illustrate a reinforcement layer 400 of a composite material in plan view and cross sectional view along the lines A-A' and B-B', respectively, according to an embodiment of the present invention. FIG. 11E is an exploded perspective view of a section of the reinforcement layer 400. For the ease of illustration, a matrix material that may embed or enclose the reinforcement layer 400 is not shown in FIGS. 11A-11E. This embodiment is another variation on the pinned rotating shearing reinforcement scheme shown in the embodiments of FIGS. 9A-9B, 10A-10B. The height of reinforcement members 402 are changed in their thickness direction to create locking structures. Only a section of the reinforcement layer 400 is shown in FIGS. 11A-11E. One skilled in the art would appreciate that the reinforcement layer 400 may include many repeated units of the structure shown in FIGS. 11A-11E. As shown in FIGS. 11A-11E, two separate reinforcement members 402 are pinned together via a pin 405 with a third reinforcement member 403 in between such that there is an overlap region at their edges. In the embodiment shown in FIGS. 11A-11E, the pin 405 may be formed on one of the two reinforcement members 402, and an opening or socket formed on the other one of the reinforcement members 402 is suitably sized to receive the pin 405 to securely couple the two reinforcement members 402 together. The pin 405 goes through an opening 407 (shown in FIG. 11E) formed on the reinforcement member 403, the opening 407 being suitably sized to allow the pin 405 to rotate freely. However, one skilled in the art would appreciate that the two reinforcement members 402 may be coupled together by other suitable methods.

Figure 11D:
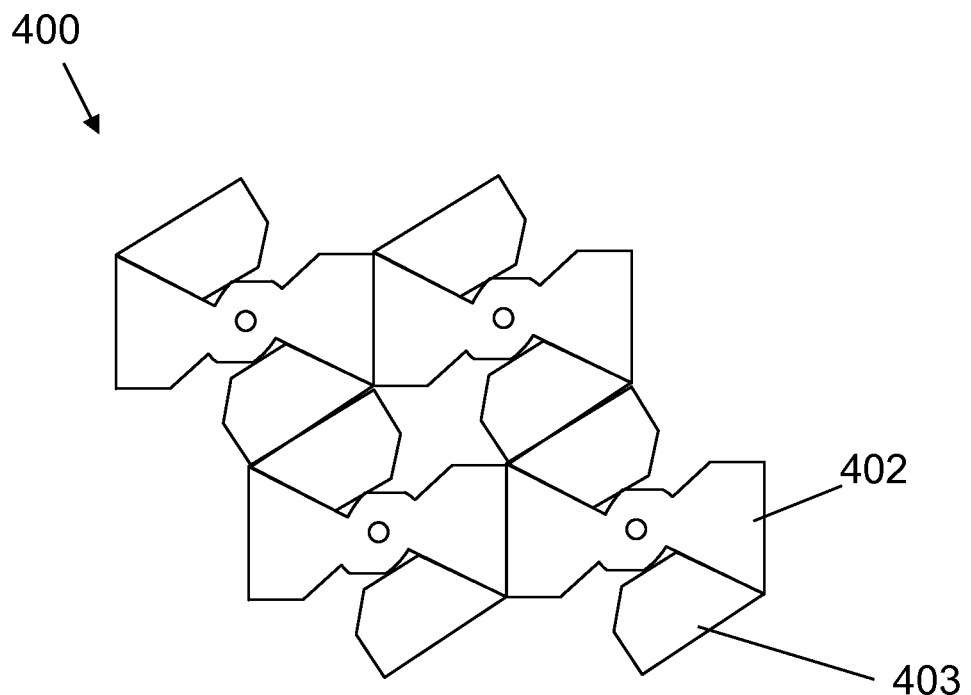
Figure 11E:
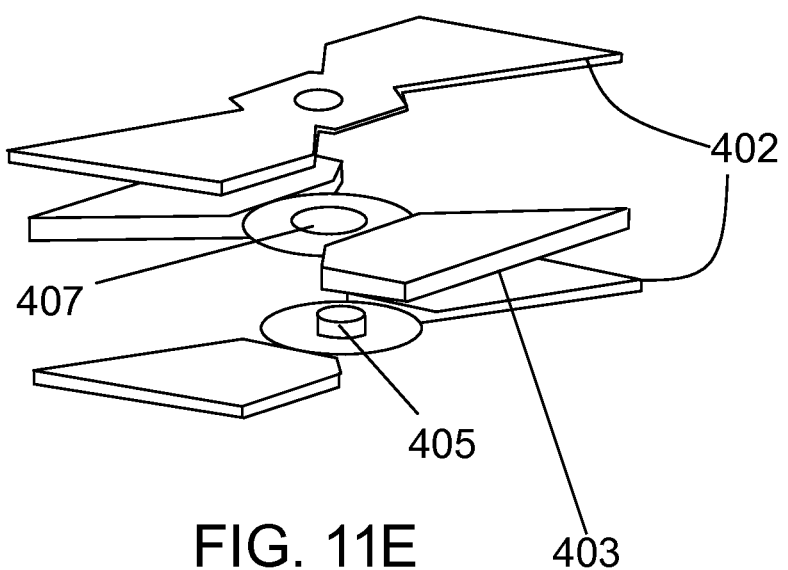

When the reinforcement members 402 are rotated in relation to the third reinforcement member 403, for example when undergoing shear deformation, the reinforcement members 402 are free to turn or rotate until their edges engage the edges of the corresponding third reinforcement member 403 as shown in FIG. 11D. At this point, the stiffness of a composite material incorporating the reinforcement layer 400 increases significantly. The same effect may be generated for the reverse direction as well. This effect provides an effective hard stop against further deformation, thereby providing high stiffness for the composite material incorporating the reinforcement layer 400 in one or another of the end configurations. This same architecture may be used in tension or compression (rather than pure shear) by rotating the axis of the reinforcement members 402 and the third reinforcement member 403 by 45°.

The above described embodiments may be prepared using standard photolithography processes commonly used in the printed circuit board and metal etching industries. For example, metal layers such as aluminum, steel, titanium, copper, etc., are patterned and etched using printed circuit board type photolithography. In this process, a mask is created and used to pattern a photoresist coating previously applied to the metal. The photoresist and metal are then subject to etching processing, for example, using acid for material removal, whereby features may be created in the metal layers. Once the metal layers are fabricated they may be incorporated with a shape memory polymer or other variable stiffness matrix material. Current processes allow these features to be created down to micron levels and across large areas of at least square meters. Therefore, the various architectures shown in the embodiments are compatible with processes that allow for introduction of these composite materials as structural composite materials for large scale applications such as aircraft and other vehicles.

By way of an example, a thermoplastic shape memory polymer (e.g., MHI Diaplex 55° C. Tg polyurethane SMP) and metallic layers are interwoven, and the assembly is consolidated under heat and pressure. In other embodiments, thermoset shape memory polymers such as Conerstone Research Group Veriflex material may be used to manufacture the laminate material. In these embodiments, metallic layers are held together and separated using spacer materials. For alignment purposes, one may use a peg and hole type system to ensure that all layers are laterally registered with respect to one another. This stack of layers is then placed into a mold and infiltrated with an uncured resin. By curing the resin, the microstructure may be fabricated. In fabricating 3D structures such as pegs and holes, lateral alignment is necessary to ensure that the features interlock as desired through the thickness of the material.

Various features may be fabricated using the above described techniques. For example, through holes may be fabricated using traditional photolithography. Pegs or pins such as those required in FIGS. 9A-9B, 10A-10B and 11A-11E may be made using timed, differential etching techniques, whereby the etchant's rate of etching is combined with specialized masking techniques to make posts or pins and other elevation rises from thicker sheets of metal.

Features such as those shown in FIGS. 8A-8B may be fabricated by utilizing the above discussed etching process to create a plane structure, which is then formed into 3D structures using stamping and bending processes. The 3D structures may potentially be fabricated directly using differential etching techniques. The plane units are then aligned and stacked to create the 3D structures. The plane units may be held together by mechanical interlocking, adhesive bonding, or brazing and soldering.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A microstructured composite material with controlled deformation comprising:
a matrix material; and
at least one reinforcement layer embedded in the matrix material and having a plurality of support members arranged in a pattern along a plane of the matrix material, each of the plurality of support members comprising:
a first support member having a protrusion extending from a surface of the first support member, the first support member having a first edge;
a second support member facing the first support member, the second support member structured to receive the protrusion, the second support member having a second edge; and
a third support member pivotably connected between the first support member and the second support member, the third support member having a third edge and a through hole, the protrusion going through the through hole,
wherein the third support member is configured to be blocked from pivoting around the protrusion in at least one direction when the third edge is in contact with at least one of the first edge and the second edge.

2. The microstructured composite material with controlled deformation of claim 1, wherein the protrusion has a plate shape, and the second support member has a slot for receiving the protrusion.

3. The microstructured composite material with controlled deformation of claim 1, wherein the matrix material is a constant elastic modulus material.

4. The microstructured composite material with controlled deformation of claim 1, wherein the matrix material is a variable elastic modulus material.

5. The microstructured composite material with controlled deformation of claim 1, wherein the first support member and the second support member are pinned together via the protrusion.

6. A microstructured composite material with controlled deformation comprising:
a matrix material; and
at least one reinforcement layer embedded in the matrix material and having a plurality of support members arranged in a pattern along a plane of the matrix material, each of the plurality of support members comprising:
a first support member having a protrusion extending from a surface of the first support member,
the first support member having a first edge and a fourth edge,
a second support member facing the first support member, the second support member structured to receive the protrusion,
the second support member having a second edge and a fifth edge, and
a third support member pivotably connected between the first support member and the second support member,
the third support member having a third edge, a sixth edge, and an opening, the protrusion traversing the opening,
wherein the third support member is configured to be blocked from pivoting around the protrusion in at least one direction when the third edge is in contact with at least one of the first edge and the second edge, and
the third support member is configured to be blocked from pivoting around the protrusion in a direction different from the at least one direction when the sixth edge is in contact with at least one of the fourth edge and the fifth edge.

\* \* \* \* \*